(12) United States Patent
Ogawa

(10) Patent No.: US 7,274,548 B2
(45) Date of Patent: Sep. 25, 2007

(54) ABNORMAL CURRENT DETERMINING METHOD, ELECTRONIC APPARATUS, AND COMPUTER PROGRAM OF SAME

(75) Inventor: Ryutaro Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 235 days.

(21) Appl. No.: 10/944,040

(22) Filed: Sep. 20, 2004

(65) Prior Publication Data

US 2005/0063113 A1    Mar. 24, 2005

(30) Foreign Application Priority Data

Sep. 18, 2003   (JP)   ............... 2003-326541

(51) Int. Cl.
*H02H 3/08* (2006.01)
(52) U.S. Cl. .................. 361/93.2; 361/57; 361/87; 455/423
(58) Field of Classification Search .............. 361/57, 361/87, 93.1, 93.2; 455/423
See application file for complete search history.

(56) References Cited

U.S. PATENT DOCUMENTS 5,297,014 A    3/1994   Saito et al.
5,390,231 A    2/1995   Hung et al.
5,512,883 A *  4/1996   Lane, Jr. ................ 361/93.2
6,512,446 B2 * 1/2003   Wang et al. ............. 338/22 R
6,804,100 B2 * 10/2004  Astala ...................... 361/93.2
6,998,807 B2 * 2/2006   Phillips et al. ............. 318/455

FOREIGN PATENT DOCUMENTS

JP    5-30734      2/1993
JP    5-276646    10/1993
JP   05-276646  * 10/1993

* cited by examiner

*Primary Examiner*—Stephen W. Jackson
*Assistant Examiner*—Terrence R. Willoughby
(74) *Attorney, Agent, or Firm*—Young & Thompson

(57) ABSTRACT

A cellular telephone 1 measures a current value after being turned on, and performs addition and subtraction of a predetermined margin to and from the measured value, and thereby sets up determination thresholds for an overcurrent and an undercurrent, namely, a minimum current value and a maximum current value, respectively. Here, the predetermined margin includes minimum allowance required (B) as a standard, a variation (E) in voltage of a power source of the cellular telephone 1, and a variation (D) in an operating temperature of the cellular telephone 1.

2 Claims, 6 Drawing Sheets

| OPERATION MODES | CURRENTS (mA) | |
|---|---|---|
| | MINimum | MAXimum |
| STANDBY | 0 | 10 |
| VOICE COMMUNICATION | 200 | 700 |
| PACKET COMMUNICATION | 200 | 500 |
| . | . | . |
| . | . | . |
| . | . | . |
| . | . | . |
| . | . | . |
| . | . | . |

Fig. 3

ABNORMAL CURRENT DETERMINING METHOD, ELECTRONIC APPARATUS, AND COMPUTER PROGRAM OF SAME

FIELD OF THE INVENTION

The present invention relates to a technical field of detecting an abnormal current in communication terminals such as cellular telephones and in various types of electronic apparatus.

BACKGROUND OF THE INVENTION

Techniques for detecting an abnormal current in various types of electronic apparatus have been heretofore proposed. In such techniques, electronic apparatus subject to detection includes a memory which stores thresholds for determination of an overcurrent in various operation modes of the equipment in the form of a table. The electronic apparatus refers to the table to determine whether or not a measured value of a current passing through the equipment exceeds the threshold for determination corresponding to each operation mode. When the determination is made that the measured value exceeds the threshold for determination, the electronic apparatus determines that the equipment is in an overcurrent state. The above-mentioned techniques are disclosed in Japanese Patent Application Laid-Open Nos. 5-30734 (JP1993-30734A) and 5-276646 (JP 1993-276646 A).

Incidentally, upon determination of an overcurrent in the above-mentioned manner, the threshold for determination to be referred to for determination must be set to a value including a margin (or an allowance) to some extent. The margin must be set to the value allowing for so-called variations among individual cases, as well as the minimum allowance required for determination. Here, the "variations among individual cases (or individual difference)" include variations in operating characteristics resulting from temperature variations incident to the use of the equipment, variations in current characteristics among individual pieces of equipment, and variations in detection characteristics among individual current detecting means.

To set the threshold for determination in electronic apparatus, it has hitherto been necessary that the margin be set to the value allowing for many factors as mentioned above. This makes it difficult for conventional electronic apparatus to detect an overcurrent with high accuracy.

In addition, the conventional techniques have been possible to detect only an overcurrent as an abnormal current, and these techniques could not detect an undercurrent.

SUMMARY OF THE INVENTION

The present invention is designed to overcome the foregoing problems. It is an object of the present invention to detect an abnormal current state (i.e. at least any of an overcurrent and an undercurrent) which arises in electronic apparatus, with high accuracy while eliminating affection caused by variations among individual pieces of electronic apparatus.

To attain the object, an abnormal current detecting method according to the present invention will be characterized by the following configuration.

Specifically, an abnormal current detecting method of detecting an abnormal current flowing in an electronic apparatus (1, 50, 70) including steps of:

detecting, in a first operation mode for setting a first threshold for determining an overcurrent and a second threshold for determining an undercurrent, a current value flowing in the electronic apparatus;

setting, in the first operation mode, a value greater by a predetermined margin than the detected current value as the first threshold and a value smaller by the predetermined margin than the detected current value as the second threshold;

detecting, in the second operation mode different from the first operation mode, a current value flowing in the electronic apparatus; and determining, in the second operation mode, an abnormal current state attributable to an overcurrent when the current value detected in the second operation mode is greater than the first threshold and an abnormal current state attributable to an undercurrent when the current value detected in the second operation mode is smaller than the second threshold.

Here, the above-mentioned object can be also achieved by an abnormal current detecting method which is configured to deal with any one of the overcurrent and the undercurrent respectively in the threshold setting step and in the determining step.

In the meantime, as another aspect of the present invention attaining the foregoing object, electronic apparatus according to the present invention will be characterized by the following configuration.

Specifically, an electronic apparatus as another aspect of the present invention for attaining the above-mentioned object includes threshold setting means (e.g., control circuit 2 and CPU 21) for, in a first operation mode for setting a first threshold for determining an overcurrent flowing in the apparatus (1, 50, 70) and a second threshold for determining an undercurrent flowing in the apparatus, setting a value greater by a predetermined margin than a current value flowing, which is detected in the apparatus in the first operation mode, as the first threshold and a value smaller by the predetermined margin than the detected current value flowing as the second threshold, and determining means (e.g., control circuit 2 and CPU 21) for, in a second operation mode different from the first operation mode, determining an abnormal current state attributable to an overcurrent when a current value flowing detected in the apparatus in the second operation mode is greater than the first threshold and meanwhile an abnormal current state attributable to an undercurrent when the detected current value is smaller than the second threshold.

Here, the above-mentioned object can be also achieved by electronic apparatus which is configured to deal with any one of the overcurrent and the undercurrent respectively in the threshold setting means and in the determining means.

Moreover, the above-mentioned object can be also achieved by a computer program to realize the respective configurations of the abnormal current determining method and the electronic apparatus described above by use of a computer, and by a computer-readable storage medium storing the computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The above and other objects, features and advantages of the present invention will become more apparent from the following detailed description when taken in conjunction with the accompanying drawings wherein:

FIG. 3 is a view conceptually showing a current value table to be stored in a holding memory of the cellular telephone;

DETAILED DESCRIPTION OF THE PREFERRED EMBODIMENTS

Preferred embodiments of the present invention will now be described in detail in accordance with the accompanying drawings. Specifically, the description is given with regard to embodiments in which the apparatus of the present invention (abnormal current determining method) is applied to a cellular telephone which is typical electronic apparatus (electronic equipment).

First Embodiment

Figure 1:
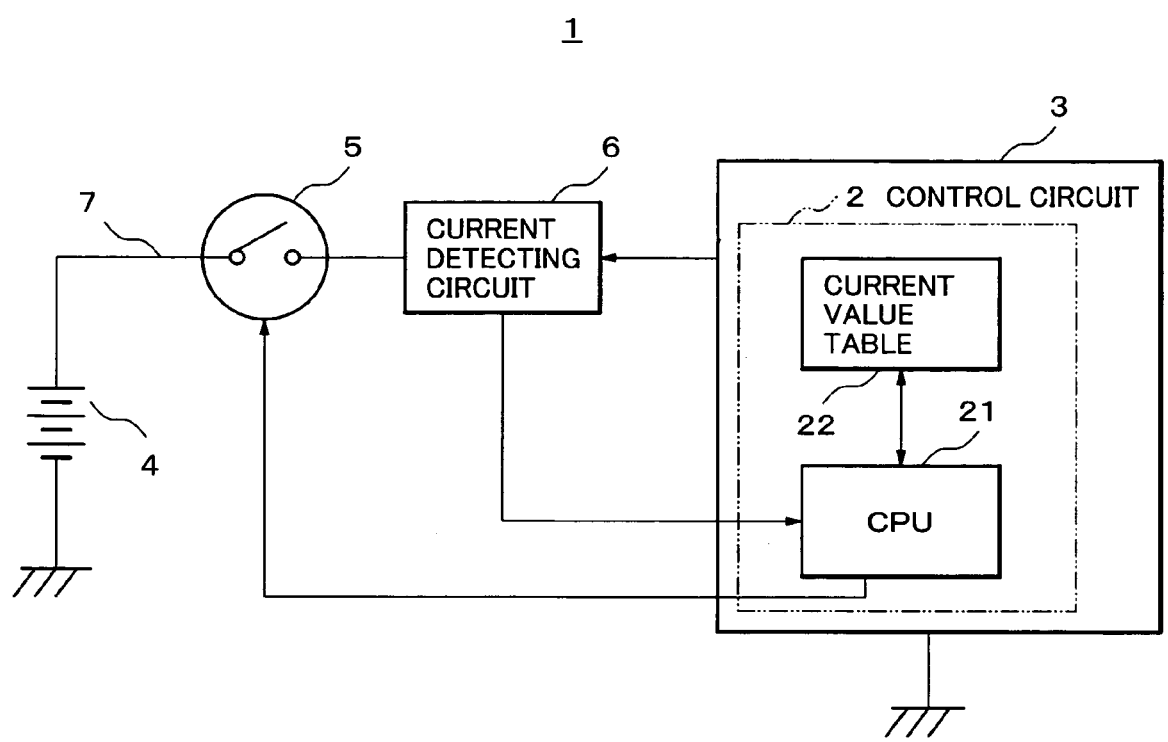
FIG. 1 is a block diagram making extracts of characteristic constituents of a cellular telephone 1 according to a first embodiment of the present invention.

FIG. 1 is a block diagram making extracts of characteristic constituents of a cellular telephone 1 according to a first embodiment of the present invention.

Firstly, the cellular telephone 1 has communication functions including voice communication, and transmission and reception of electronic mails. Moreover, the cellular telephone 1 is configured to be operable in plural types of operation modes, such as standby status, voice communication status, packet communication status, and electronic mail editing status. The descriptions will be given later with reference to FIG. 2 with regard to the general configuration of the cellular telephone 1, which serves to implement the communication functions and the operations in a plurality of operation modes.

As shown in FIG. 1, the cellular telephone 1 broadly includes a main unit 3, a power source 4, a power switch 5, and a current detecting circuit 6. The main unit 3 includes a control circuit 2 having a central processing unit (CPU) 21, a current value table 22, and the like. The power source 4 is made of a secondary battery or the like, which supplies power to the main unit 3. The power switch 5 turns on and off the power supply (i.e. through a feed line 7) from the power source 4 to the main unit 3. The current detecting circuit 6 detects a value of a current supplied from the power source 4 to the main unit 3.

Figure 2:
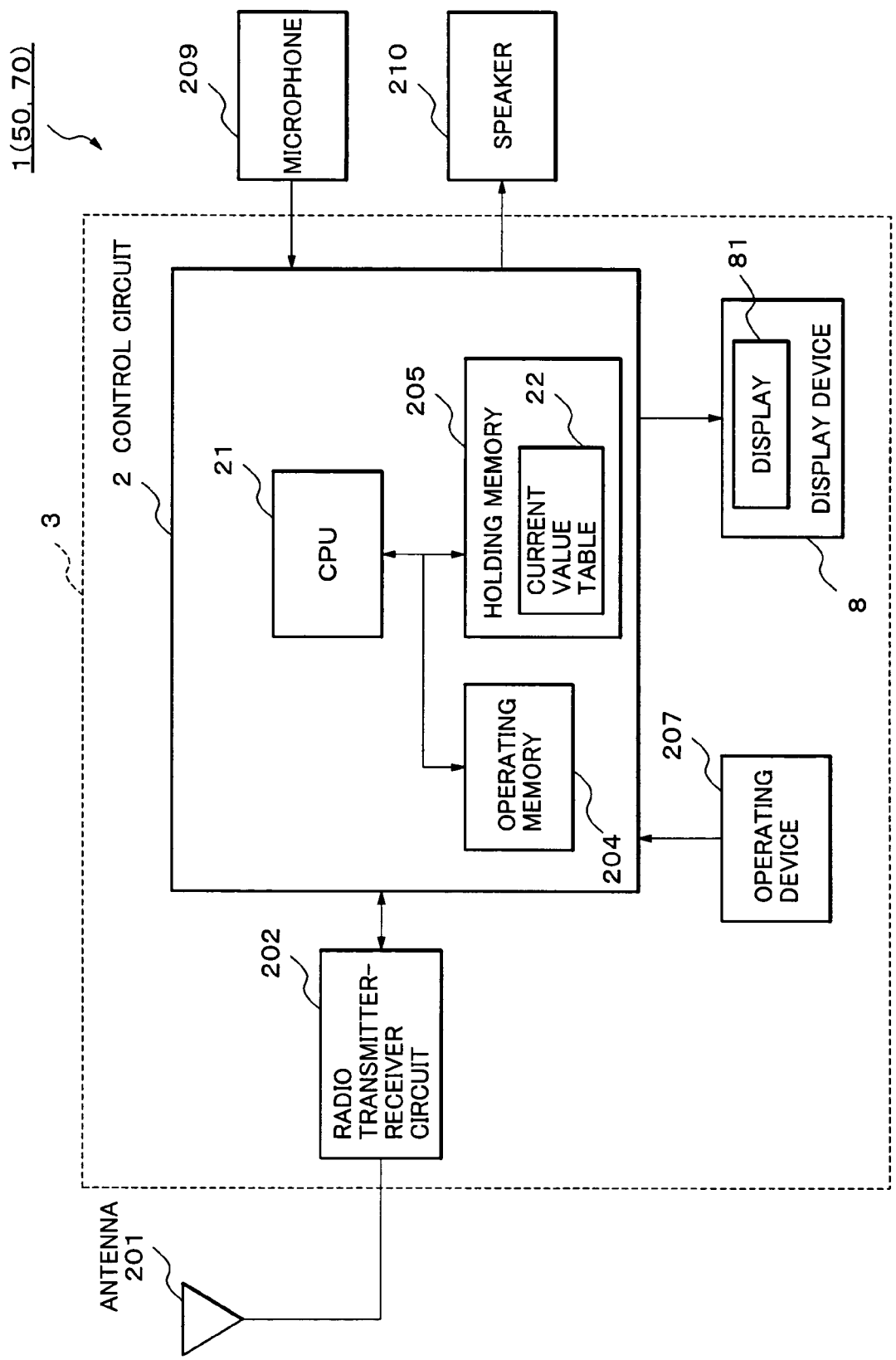
FIG. 2 is a block diagram showing an example of a configuration of the cellular telephone 1 which can apply the present invention.

Next, the description is given with regard to the general configuration of the cellular telephone 1 including the configuration as described above and shown in FIG. 1. FIG. 2 is a block diagram showing an example of the configuration of the cellular telephone 1 in which the present invention can be applied.

In this embodiment, the cellular telephone 1 includes an antenna 201, a radio transmitter-receiver circuit 202, the control circuit 2, an operating device 207, a display device 8, a microphone 209, and a speaker 210.

The control circuit 2 includes the CPU 21, an operating memory 204, a holding memory 205, and other unillustrated hardware. In the control circuit 2, the CPU 21 controls the operation of each part of the cellular telephone 1 by executing a group of programs read out of the holding memory 205.

Specifically, the CPU 21 of the control circuit 2 provides notification of an incoming call by detecting a call number of the telephone 1 from a signal demodulated by the radio transmitter-receiver circuit 202. By processing an audio signal or a digital data signal, the CPU 21 of the control circuit 2 also conducts voice communication using the microphone 209 and the speaker 210, data communication such as the function to transmit and receive electronic mails or the function to connect to a server, and other communications. In this embodiment, the CPU 21 of the control circuit 2 also sets thresholds for determination of a detected current, determines an abnormal current, controls to shut off the power source, determines operation modes, or performs other operations.

In addition, when executing a group of programs read in the operating memory 204, the CPU 21 of the control circuit 2 follows instructions which are inputted by a user with the operating device 207 (including a pointing device).

The operating device 207 includes a plurality of pushbuttons (not shown) for allowing the user to input information. The operating device 207 is used when the user inputs a telephone number to make a call, when the user inputs texts for registration with an address book or the like, or when the user inputs settings for various functions.

The display device 8 includes a display 81 such as a liquid crystal display. The display device 8 displays on the display 81 the contents of various types of inputted information associated with the user's operation with the operating device 207.

The operating memory 204 (RAM: a random access memory) is used as a working memory for the operation of the CPU 21.

The holding memory 205 is a nonvolatile memory such as a flash memory. The holding memory 205 holds various parameters in the current value table 22 and the like, a group of operation programs to be executed by the CPU 21, the call number of the telephone 1 (the number for an outgoing call) user data (e.g. electronic mail messages and telephone numbers), and so on.

The antenna 201 has the same functions as antennas of known radio communication terminals, such as a function to transmit and receive phase-modulated radio waves.

The radio transmitter-receiver circuit 202 performs demodulation of a radio wave received by the antenna 201, and performs phase modulation of a digital signal outputted from the control circuit 2. The radio transmitter-receiver circuit 202 also has the same functions as radio transmitter-receiver circuits included in known radio communication terminals.

Meanwhile, voices of the user are inputted to the microphone 209. The speaker 210 outputs voices (or sounds) to the user.

Concerning operations such as data transmission and reception processing or voice processing to be executed by the cellular telephone 1 having the above-described configuration in relation to an external apparatus, it is possible to apply techniques that are common today. Accordingly, the detailed description of these operations will be omitted from the description of this embodiment.

As shown in FIG. 1, the power switch 5 is disposed on the feed line 7 extending from the power source 4 to the main unit 3. In response to a control signal from the CPU 21, the power switch 5 turns on (to a power-on state) and off (to a power-off state) the feed line 7. More specifically, the power is supplied from the power source 4 to the main unit 3 when the power switch 5 is turned on. In this case, the cellular telephone 1 is turned on. On the other hand, the power from the power source 4 to the main unit 3 is completely shut off when the power switch 5 is turned off. In this case, the cellular telephone 1 is turned off.

As shown in FIG. 1, for example, the current detecting circuit 6 is disposed on the feed line 7 between the power switch 5 and the main unit 3, for example. This current detecting circuit 6 detects a current supplied from the power source 4 to the main unit 3 through the power switch 5. The current detecting circuit 6 then inputs the detected value of the current to the control circuit 2.

FIG. 3 is a view conceptually showing the current value table to be stored in the holding memory of the cellular telephone. In this embodiment, the current value table 22 is stored in the holding memory 205 of the control circuit 2 as shown in FIG. 1. As shown in FIG. 3, the current value table 22 stores the minimum current value (MIN) linked to the maximum current value (MAX) for each operation mode of the cellular telephone 1.

Here, the minimum current value (hereinafter referred to as an "undercurrent" when appropriate) means a threshold for determination, which is used to detect the minimum current required for the cellular telephone 1 to operate normally. The maximum current value (hereinafter referred to as an "overcurrent" when appropriate) means a threshold for determination, which is used to detect the maximum permissible current for the cellular telephone 1 to operate normally.

The current value table 22 in an initial state prestores the respective initial values of the minimum current value (MIN) and the maximum current value (MAX) for each of the operation modes such as the standby status or the voice communication status. The initial value includes not only a reference margin (i.e. the minimum allowance), but also a margin which has been preset to allow for variations among individual cellular telephones 1 due to various factors.

Here, the variations among individual cellular telephones include the following:

(a) variations in current characteristics among the individual cellular telephones 1;

(b) variations in the accuracy of current value detection among the individual current detecting circuits 6; and (c) variations due to the conditions of operating temperatures, and variations in voltage among the individual power sources 4.

Here, the "variations due to the conditions of operating temperatures" mean variations in operating characteristics resulting from heat generated by internal electronic devices such as ICs and LSIs associated with the operation of the telephones 1. Incidentally, the same definition applies to other embodiments to be described later. The variations in operating characteristics are caused mainly by changes in current consumption in response to the temperature variations of these devices.

Updating Operation of the Minimum and Maximum Current Values

In this embodiment, the initial values are the thresholds for determination, for example, which are predetermined in the design stage of the cellular telephone. When an operator turns on the power, the CPU 21 moves to an updating operation mode and updates the values stored in the current value table 22 so as to change the initial values to the optimum thresholds for the individual cellular telephone through the procedure described below. Thus, in the updating operation mode, the control circuit 2 and the CPU 21 collectively function as a threshold setting circuit for setting thresholds for determination of occurrence of an abnormal current state.

To be more precise, in this embodiment, an updating operation from the initial values to the optimum values reflecting the variations among the individual telephones (the updating operation mode) is performed only once at the first execution of each operating mode of the cellular telephone 1. Such an updating operation (the updating operation mode) is executed upon a product check before factory shipment or upon a product check at product maintenance. Alternatively, the updating operation mode may be executed every time at the first execution of the individual operation modes after the cellular telephone 1 is turned on by the user. Such an aspect is preferable as the user can set up the minimum current value and the maximum current value at anytime while considering aged deterioration of the cellular telephone.

In this embodiment, the initial values to be held in the current value table 22 are expressed as the following formulae:

$$\text{Initial minimum current value: } A-(B+C+D+E) \quad (1);$$

and $$\text{Initial maximum current value: } A+(B+C+D+E) \quad (2)$$

Here, concerning the formulae (1) and (2):

a) A denotes a mean value of a predicted current value;

b) B denotes the reference margin (the minimum allowance required);

c) C denotes a margin determined in consideration of the variations in the current characteristics among the individual cellular telephones 1 and the variations in the detection accuracy among the individual current detecting circuits 6;

d) D denotes a margin determined in consideration of the variation due to the conditions of the operating temperatures; and e) E denotes a margin determined in consideration of the variations in voltage among the power sources 4.

Note that the above-described margin A to margin E similarly are applied to the respective embodiments to be described later.

Here, with regard to the initial values, a difference between the minimum current value and the maximum current value is obtained by subtracting the formula (1) from the formula (2), namely, as 2(B+C+D+E).

Then, the initial values which are prestored in the cellular telephone depending on each operation mode will be updated with the values as will be described below at the first execution of the individual operation mode.

Specifically, the minimum current value and the maximum current value which are expressed by the formulae (1) and (2) in the initial state (the initial values) will be updated with values excluding the above-described margin C depending on each operation mode.

To be more precise, the current value detected by the current detecting circuit 6 will be defined as X herein. In this case, the CPU 21 updates the initial value of the maximum current value (the formula (2)) with a value obtained by adding a predetermined margin to the current value X. Specifically, the CPU 21 obtains the updated maximum current value by use of the following formula:

$$X+(B+D+E) \qquad (3)$$

Meanwhile, the CPU 21 updates the initial value of the minimum current value (the formula (1)) with a value obtained by subtracting the predetermined margin from the current value X. Specifically, the CPU 21 obtains the updated minimum current value by use of the following formula:

$$X-(B+D+E) \qquad (4)$$

Now, focusing on the difference between the minimum current value and the maximum current value after the updating operation, the difference is equal to a value obtained by subtracting the formula (4) from the formula (3), namely, as 2(B+D+E). The minimum current value, the maximum current value, and the difference therebetween after the updating operation do not include the above-described margin C (that is, the margin determined in consideration of the variations in the current characteristics among the individual cellular telephones 1 and the variations in the detection accuracy among the individual current detecting circuits 6). In other words, the minimum current value and the maximum current value after the updating operation include only the reference margin B (the minimum allowance required), the margin D (the margin determined in consideration of the variation due to the conditions of the operating temperatures of the cellular telephone 1), and the margin E (the margin determined in consideration of the variations in voltage among the power sources).

Current Monitoring Operation by Cellular Telephone 1

During an operation (in a period when the power is turned on) after setting the thresholds in the updating operation mode, the CPU 21 of the control circuit 2 monitors occurrence of an abnormal current state as described below. At this time, the control circuit 2 and the CPU 21 collectively function as a determination circuit for determining occurrence of an abnormal current state.

Specifically, the CPU 21 of the control circuit 2 compares the current value inputted from the current detecting circuit 6 (the detected value) with the minimum current value and the maximum current value which are stored in the current value table 22. Then, in response to the result of comparison, the CPU 21 monitors the following two aspects, namely:

an aspect as to whether or not the detected value from the current detecting circuit 6 falls below the minimum current value (whether or not an undercurrent state is present); and an aspect as to whether or not the detected value from the current detecting circuit 6 exceeds the maximum current value (whether or not an overcurrent state is present).

Next, in response to the result of monitoring (the result of comparison between the current value inputted from the current detecting circuit 6 and the values in the current value table 22), the CPU 21 outputs a control signal for tuning off the power switch 5. In this case, the cellular telephone 1 stops the operation in response to the power-off.

Figure 4:
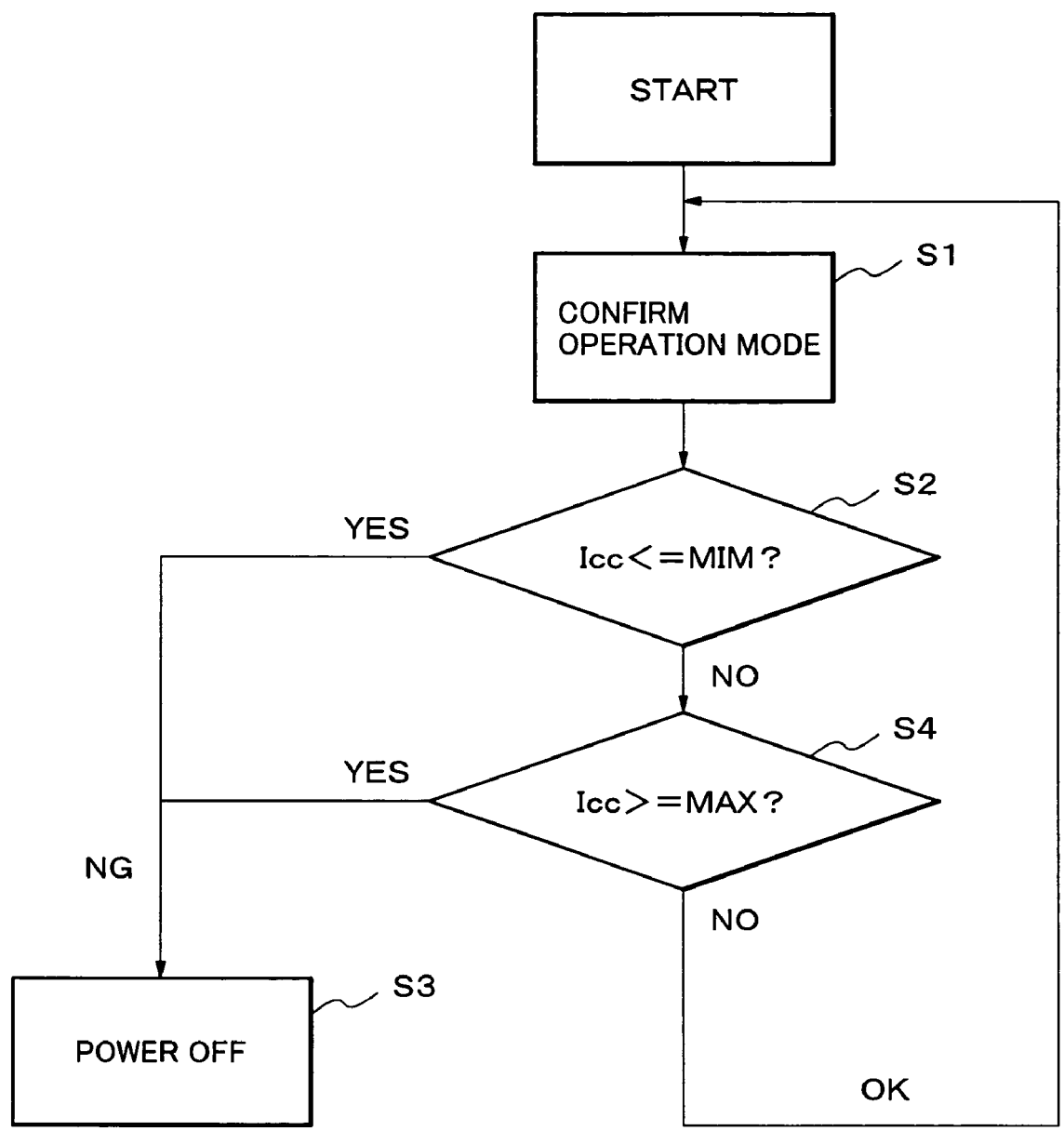
FIG. 4 is a flowchart showing a current monitoring and controlling process to be performed by the cellular telephone according to the first embodiment.

In the following, the current monitoring operation described above will be explained with reference to FIG. 4. FIG. 4 is a flowchart showing a current monitoring and controlling process to be performed by the cellular telephone according to the first embodiment. The flowchart shows procedures in a software program to be executed by the CPU 21 of the control circuit 2 shown in FIG. 2.

In the cellular telephone 1, firstly a current flows from the power source 4 to the main unit 3 in response to the operation to turn on the power switch 5 by the user. This current value (the value of the current flowing on the cellular telephone 1) is detected by the current detecting circuit 6. Then, this detected value is inputted to the CPU 21 of the control circuit 2.

The CPU 21 confirms the operation mode at that point (Step S1). For example, when the operation mode of the cellular telephone 1 is the "voice communication mode", the CPU 21 refers to the current value table 22 in the holding memory 205 and thereby obtains the minimum current value (which is equal to 200 mA in the example of FIG. 3) corresponding to the "voice communication mode". Then, the CPU 21 compares the obtained minimum current value (MIN) with the current value (Icc) detected by the current detecting circuit 6.

Thereafter, in Step S2, when the current value (Icc) is determined to be smaller than the minimum current value (an undercurrent determination threshold) (when determined as YES in Step S2), it is possible to determine that the cellular telephone 1 is in the undercurrent state. Accordingly, the CPU 21 outputs the control signal for tuning off the power switch 5 (Step S3). In this way, the power switch 5 is turned off and thereby stops feeding the main unit 3. That is, the cellular telephone 1 stops the operation by the control circuit 2 and the CPU 21 functioning as a power shutoff circuit and by the power switch 5.

On the contrary, when the current value (Icc) is determined to be greater than the minimum current value (when determined as NO in Step S2), it is possible to determine that the cellular telephone is not at least in the undercurrent state. Accordingly, the CPU 21 compares the maximum current value (which is equal to 700 mA in the example of FIG. 3) with the current value (Icc) (Step S4).

In Step S4, when the current value (Icc) is determined to be greater than the maximum current value (an overcurrent determination threshold) (when determined as YES in Step S4), it is possible to determine that the cellular telephone 1 is in the overcurrent state. Accordingly, the CPU 21 outputs the control signal for tuning off the power switch 5 (Step S3). In this way, the power switch 5 is turned off and thereby completely stops feeding the main unit 3. That is, the cellular telephone 1 stops the operation in this case as well.

On the contrary, when the current value (Icc) is determined to be smaller than the maximum current value (when determined as NO in Step S4), it is possible to determine that the cellular telephone is not in the undercurrent state nor in the overcurrent state (i.e. not in the abnormal current state but in a normal state). Accordingly, the CPU 21 maintains the control signal to the power switch to on-state, and returns to Step S1 to repeat the above-described series of processing.

Thereafter, the CPU 21 continues to monitor the abnormal current (the overcurrent or the undercurrent) throughout the period when the cellular telephone 1 is turned on by means of repeating the operations described in Steps S1 to S3. Upon detection of the abnormal current state, the CPU 21 shuts off the power immediately.

As described previously, this current monitoring operation is conducted by referring to the minimum current value and the maximum current value after the updating operation. Accordingly, the updated minimum current value (the formula (4)) and the updated maximum current value (the formula (3)) do not include the margin C, which had been included in the initial values (the formula (1) and the formula (2)), as a result of the updating operation executed in advance in the updating operation mode.

According to the above-described first embodiment, the value greater by the predetermined margin than the current value flowing on the cellular telephone 1 is set (updated) as the determination threshold for the overcurrent (the updated maximum current value: the formula (3)), and the value smaller by the predetermined margin than the current value is set (updated) as the determination threshold for the undercurrent (the updated minimum current value: the formula (4)).

The difference between the updated minimum current value and the updated maximum current value 2(B+D+E) is smaller than the difference between the initial minimum current value and the initial maximum current value 2(B+C+D+E) since the former does not include the margin C. In other words, in the individual cellular telephone 1, the detection range of the abnormal current state is automatically modified from 2(B+C+D+E) based on the initial values to 2(B+D+E) after updating when the minimum current value and the maximum current value are updated from the initial values. Therefore, after the updating operation, the individual cellular telephone 1 can monitor the current with higher accuracy as compared to the case of referring to the prestored initial values.

That is, in this embodiment, the individual cellular telephone 1 measures the current value when the power is turned on, and sets up the respective determination thresholds for the overcurrent and the undercurrent by adding and subtracting the predetermined margin to and from the measured value. In this way, it is possible to eliminate the variations among the individual cellular telephones 1 and to reduce the amount (the width) of the margin as compared to the initial values shown in the formula (1) and the formula (2). As a result, it is possible to detect the abnormal current with high accuracy.

Moreover, the abnormal current state is determined when the current value flowing on the cellular telephone 1 falls below the undercurrent determination threshold which is particularly set up herein. Therefore, it is possible to detect the undercurrent which had been previously impossible.

Second Embodiment

Figure 5:
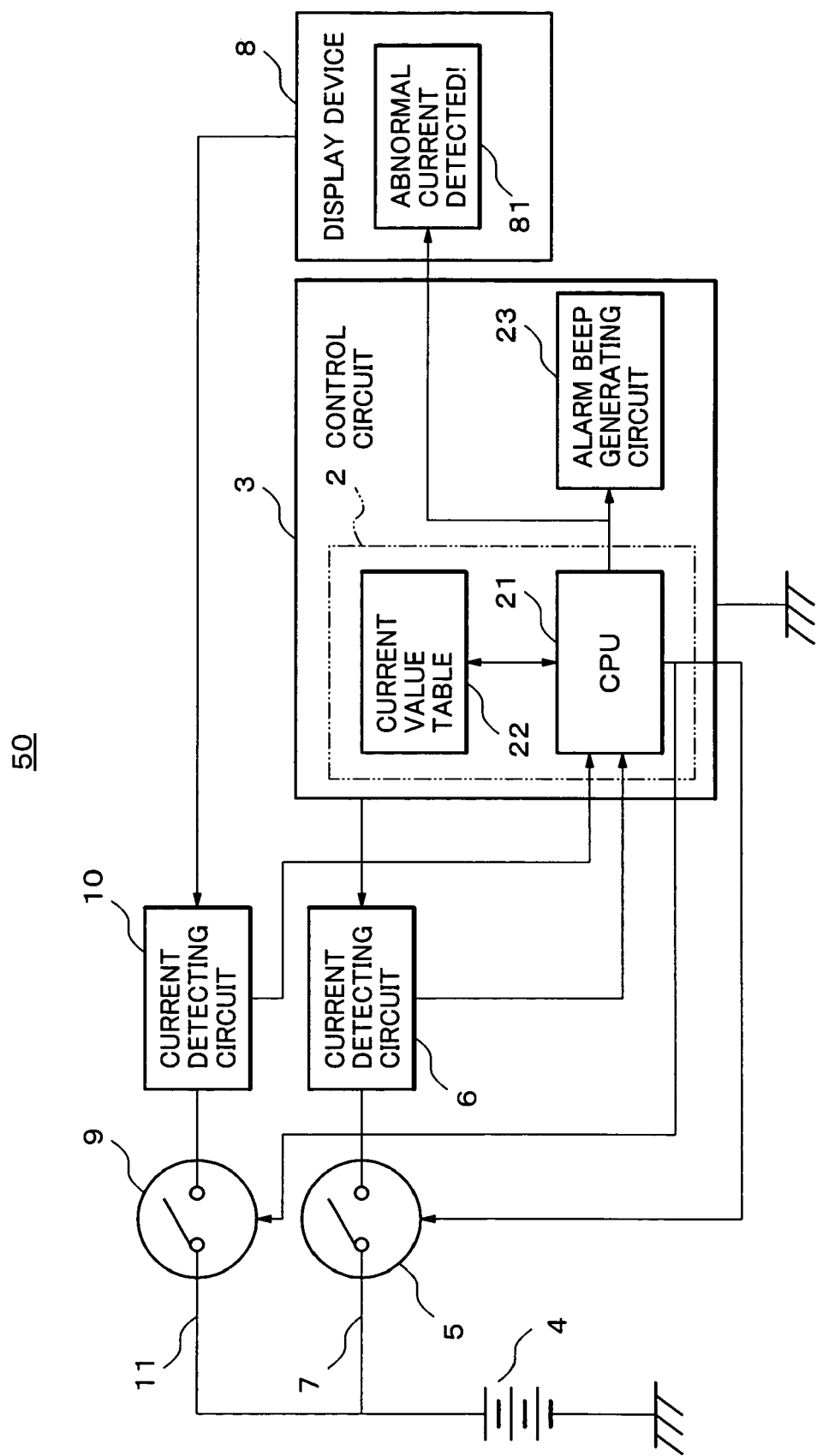
FIG. 5 is a block diagram making extracts of characteristic constituents of a cellular telephone according to a second embodiment of the present invention.

Next, a second embodiment of the present invention will be described with reference to FIG. 5. FIG. 5 is a block diagram making extracts of characteristic constituents of a cellular telephone according to the second embodiment of the present invention.

A cellular telephone 50 (FIG. 5) according to the second embodiment is different from the cellular telephone 1 according to the first embodiment only in terms of the points to be described below. Since other aspects of the cellular telephone 50 are similar to those of the cellular telephone 1, like reference numerals designate like constituents and the description thereof will be omitted.

The cellular telephone 50 has a basic configuration which is similar to that of the cellular telephone 1. However, for the purpose of facilitating the explanation, an assumption will be made herein that the display device 8 be not incorporated in the main unit 3.

Specifically, the cellular telephone 50 according to the second embodiment includes a plurality of devices (such as the main unit 3 and the display device 8) to which the power can be supplied from the power source 4 independently.

Moreover, the main unit includes an alarm beep generating circuit 23 for generating an alarm beep upon occurrence of an abnormal current. Here, the alarm beep generating circuit 23 may be combined with the speaker 210, for example.

Specifically, the plurality of devices provided to the cellular telephone 1 includes a display module (such as the display device 8) having the display 81, and a sound generation module (such as the speaker 210) which can perform a sound generating operation.

The cellular telephone 50 further includes a power switch 9 for turning on and off the power supply from the power source 4 to the display device 8, and a current detecting circuit 10 for detecting a value of a current supplied from the power source 4 to the display device 8.

Of these elements, the power switch 9 is disposed on a feed line 11 extending from the power source 4 to the display device 8. The power switch 9 is turned on and off by a control signal from the CPU 21. When this power switch 9 is turned on, the power is supplied from the power source 4 to the display device 8, and the display device 8 is thereby turned on. On the contrary, when the power switch 9 is turned off, the power supply from the power source 4 to the display device 8 is completely shut off, and the display device 8 is thereby turned off.

In the meantime, the current detecting circuit 6 detects the current supplied from the power source 4 to the main unit 3 through the power switch 5 in this embodiment as well.

For example, the current detecting circuit 10 is disposed on the feed line 11 between the power switch 9 and the display device 8. This current detecting circuit 10 detects a current supplied from the power source 4 to the display device 8, and then inputs the detected value of the current to the control circuit 2.

Now, in the configuration of the apparatus as described above, the CPU 21 determines an abnormal current state occurring in the main unit 3 and an abnormal current state occurring in the display device 8.

To attain this, the current value table 22 stores determination thresholds (not shown) for the display device 8 in addition to the determination thresholds (FIG. 3) for the main unit 3.

Here, the data configuration of the determination thresholds for the display device 8 may adopt a table which is similar to the table for the main unit 3 shown in FIG. 3 as example. Meanwhile, in this embodiment, the updating operation for the initial determination thresholds and the determining operation for the abnormal current state to be carried out after the updating operation are similar to the above-described first embodiment. Accordingly, the description related thereto will be omitted.

Next, concrete operations of the cellular telephone 50 according to this embodiment will be described below.

In this embodiment, the CPU 21 independently performs the current monitoring similar to the current monitoring and controlling process described in the first embodiment, in relation not only to the main unit 3 but also to the display device 8.

Specifically, when the main unit 3 is determined to be in the abnormal current state by use of the detected current from the current detecting circuit 6, the CPU 21 displays a message indicating occurrence of the abnormal current state on the display 81 of the display device 8 prior to turning off the power switch 5 to shut off the power supply to the main unit 3. To be more precise, the CPU 21 controls the display device 8 so as to notify the user of the occurrence of the abnormal current state, and thereby displays a message "ABNORMAL CURRENT DETECTED!" as shown in a frame representing the display 81 of the display device 8, for example. Upon display of such a message, it is also possible to display a message urging inspection or repair in addition to the notification of the abnormal state.

Thereafter, the CPU 21 turns off only the power switch 5 out of the power switches 5 and 9. That is, the main unit 3 stops the operation by the control circuit 2 and the CPU 21 functioning as a power shutoff circuit and by the power switch 5. At this time, the power supply to the display device 8 is continued. Accordingly, the above-mentioned message remains displayed on the display device 8.

Here, in this embodiment, the user may operate a power button (not shown) or a reset switch (not shown) for operating the connection states of the power switches 5 and 9 manually to turn off the display device 8.

On the contrary, when the display device 8 is determined to be in the abnormal current state by use of the detected current from the current detecting circuit 10, the CPU 21 turns off only the power switch 9 out of the power switches 5 and 9, and thereby stops feeding the display device 8. That is, the display device 8 stops the operation by the control circuit 2 and the CPU 21 functioning as the power shutoff circuit and by the power switch 9. Moreover, the CPU 21 causes the alarm beep generating circuit 23 to generate an alarm beep, and thereby notifies the user of the abnormal state of the display device 8.

It is noted that, in this embodiment, the user may operate the power button (not shown) or the reset switch (not shown) for operating the connection states of the power switches 5 and 9 manually to turn off the alarm beep generating circuit 23 and to stop the alarm beep.

According to the above-described second embodiment, it is possible to detect the abnormal current state occurring in the cellular telephone 50 with high accuracy, while eliminating the variations among the individual cellular telephones 50 as similar to the above-described first embodiment. Moreover, according to this embodiment, in case of the cellular telephone 50 provided with the plurality of devices (the main unit 3 and the display device 8) to which the power is supplied independently, the CPU 21 independently determines the abnormal current state on the respective devices. Therefore, the use can easily recognize as to which device is in the abnormal current state.

To be more precise, when a device other than the display device (such as the alarm beep generating circuit 23 in the main unit 3) is determined to be in the abnormal current state, the CPU 21 notifies the occurrence of the abnormal current state by way of display on the display device 8. Accordingly, the use can recognize the abnormal current state of the relevant device other than the display device by way of such notification.

Meanwhile, when a device other than the sound generating device (such as the display device 8) is determined to be in the abnormal current state, the CPU 21 notifies the occurrence of the abnormal current state by way of the sound generating operation using the alarm beep generating circuit 23. Accordingly, the use can recognize the abnormal current state of the relevant device other than the sound generating device by way of such notification.

Third Embodiment

Figure 6:
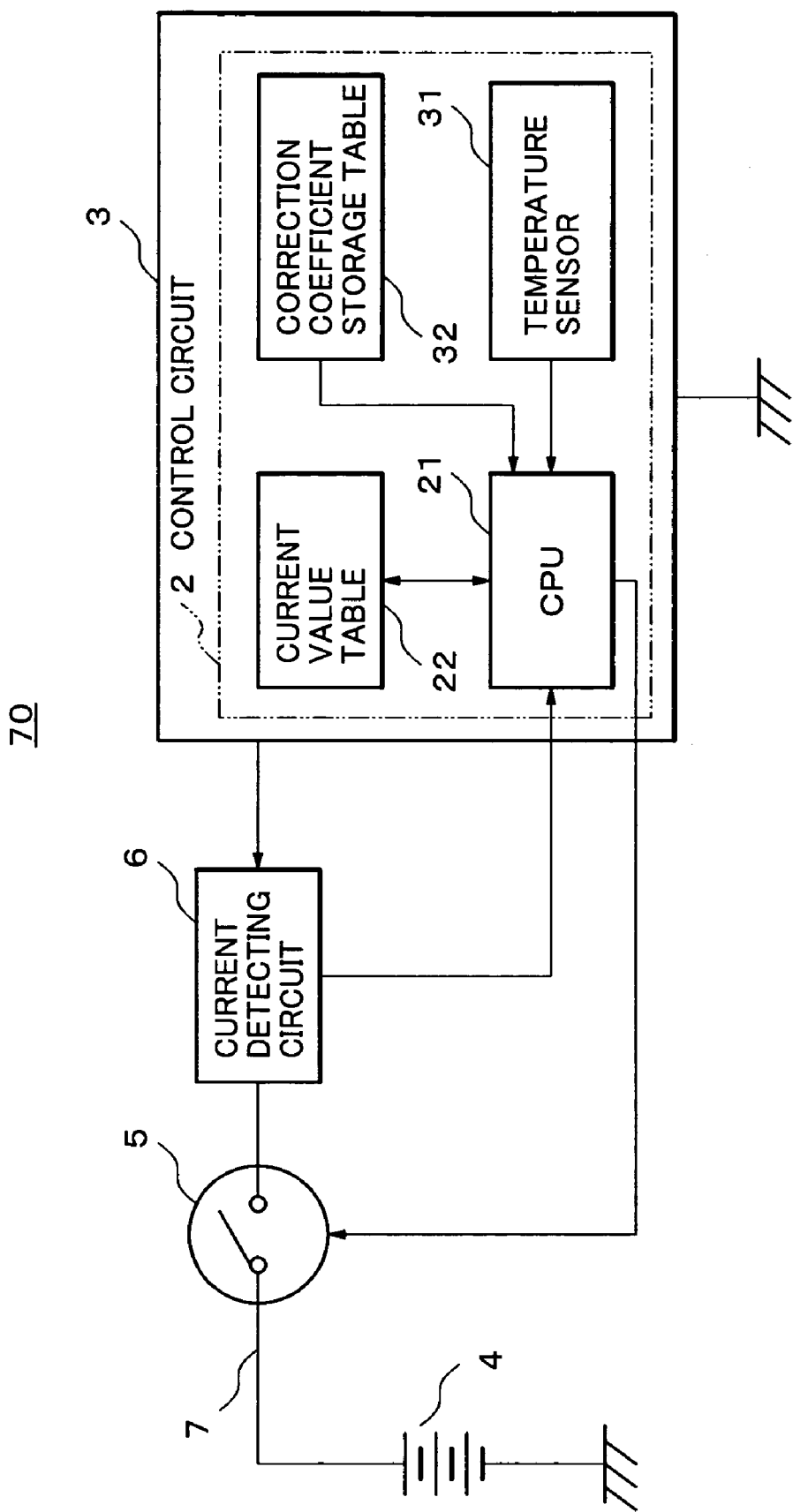
FIG. 6 is a block diagram making extracts of characteristic constituents of a cellular telephone according to a third embodiment of the present invention.

Next, a third embodiment of the present invention will be described with reference to FIG. 6. FIG. 6 is a block diagram making extracts of characteristic constituents of a cellular telephone according to the third embodiment of the present invention.

A cellular telephone 70 (FIG. 6) according to the third embodiment is different from the cellular telephone 1 according to the first embodiment only in terms of the points to be described below. Since other aspects of the cellular telephone 70 are similar to those of the cellular telephone 1, like reference numerals designate like constituents and the description thereof will be omitted.

In addition to the configuration of the cellular telephone 1 according to the first embodiment, the cellular telephone 70 includes a temperature sensor 31 and a correction coefficient storage table 32.

The temperature sensor 31 measures the temperature of the cellular telephone 70 (the operating temperature). The measured temperature is inputted to the CPU 21.

The correction coefficient storage table 32 includes a set of correction coefficients for correcting the determination thresholds (the minimum current value and the maximum current value) in response to the operating temperature of the cellular telephone 70, which are stored in the holding memory 205, for example. This correction coefficient storage table 32 stores the correction coefficients (the correction coefficients for the minimum current values and the correction coefficients for the maximum current values) which are linked to respective temperature conditions of supposed environment for using the cellular telephone 70 (supposed operating temperatures).

Updating Operation of Minimum Current Value and Maximum Current Value

In this embodiment as well, the cellular telephone 70 performs the updating operation (the updating operation mode) of the determination thresholds from the initial state and the current monitoring operation based on the updated determination thresholds as similar to the first embodiment. However, in this embodiment, the CPU 21 multiplies the determination thresholds stored in the current value table 22 (the minimum current value and the maximum current value as the initial values) respectively by the correction coefficients on the correction coefficient storage table 32 in the course of the updating operation of the determination thresholds. Then, the CPU 21 stores the values after such multiplications in the current value table 22 as the updated determination thresholds.

Specifically, in this embodiment, the determination thresholds after the multiplications (the updated minimum current value and the updated maximum current value) do not include the margin D (the margin determined in consideration of the variation due to the conditions of the operating temperatures). That is, in the course of the updating operation, the CPU 21 performs correction by means of multiplying the minimum current value (X−(B+D+E)) and the maximum current value (X+(B+D+E)) excluding the margin C as similar to the first embodiment by the relevant correction coefficients on the correction coefficient storage table 32. The correction coefficients are preset values designed to convert the minimum current value equal to Z−(B+E) and the maximum current value equal to Z+(B+E). Here, Z denotes a value obtained by updating the detected current value X with the relevant correction coefficient.

In this embodiment, the CPU 21 obtains the correction coefficients corresponding to the value measured by the temperature sensor 31 from the correction coefficient storage table 32 (refers to the correction coefficient storage table 32), and updates (corrects) the determination thresholds (the minimum current value and the maximum current value) by use of the obtained correction coefficients.

Here, it is predictable that the environment for using the cellular telephone 70 by the user be constantly changed. Accordingly, the value measured by the temperature sensor 31 is not always definite. Therefore, instead of design the updating operation to be executed only at maintenance time, it is preferable in this embodiment to design the updating operation every time at the first execution of each operation mode when the cellular telephone 70 is turned on by the user.

Current Monitoring Operation by Cellular Telephone 70

In the cellular telephone 70 according to this embodiment, the CPU 21 determines an abnormal current state by use of the determination thresholds which are updated (corrected) in the above-described updating operation. This current monitoring operation per se includes the procedures similar to those in the current monitoring and controlling process (FIG. 4) described in the first embodiment.

However, in this embodiment, the predetermined margin in the updated determination threshold includes only the minimum allowance required (the margin B) and the margin E determined in consideration of the variations in voltage among the power sources. In addition, whereas the difference between the minimum current value and the maximum current value after the updating operation is equivalent to 2(B+D+E) in the first embodiment, the difference between the minimum current value and the maximum current value after the updating operation is equivalent to 2(B+E) in this embodiment. That is, the determination threshold for reference by the CPU 21 upon determination does not include the margin D (the margin determined in consideration of the variation due to the conditions of the operating temperatures of the cellular telephone 70). In this way, accordingly to this embodiment, it is possible to detect the abnormal current state even more accurately as compared to the first embodiment.

Modified Example of Third Embodiment

The third embodiment has been described in the case where the predetermined margin includes only the margin B and margin E. However, it is also possible to design the predetermined margin to include only the margin B (i.e. the minimum allowance required). Specifically, it is possible to delete the above-described margin E in case of a small variation in voltage among the power sources or when a current variation is hardly observed despite occurrence of the variation in voltage among the power sources.

Fourth Embodiment

A fourth embodiment is based on any of the cellular telephones 1, 50, and 70 according to the first to third embodiments. However, the cellular telephone in this embodiment further includes a locking function (a nullifying function) when turning on the power again. Specifically, in this embodiment, if the power is shut off due to occurrence of an abnormal current state and the abnormal current state is still determined immediately after the power is turned on again, the CPU 21 locks up the power so as not to turn on the cellular telephone again.

That is, when the cellular telephone 1 (50, 70) is turned off due to the abnormal current state determined by the CPU 21 and if the abnormal current state is still determined even after the power is turned on again by the user, the CPU nullifies a trigger for turning on the cellular telephone 1 (50, 70) thereafter. On the contrary, if the abnormal current state is not determined after the power is turned on again (in the normal state), the cellular telephone 1 will continue the operation.

According to the fourth embodiment, when the cellular telephone 1 (50, 70) is turned off due to determination of the abnormal current state and the abnormal current state is still determined even after the power is turned on again, the trigger for turning on the cellular telephone 1 is nullified thereafter. In this way, it is necessary to repeat redundant operations and control thereafter.

It is noted that the first to fourth embodiments have been described on the examples of applying an abnormal current determination apparatus of the present invention to the cellular telephones 1, 50, and 70. However, the application of the present invention is not limited only to the cellular telephone. The present invention is broadly applicable to various types of electronic apparatus including communication terminals (portable communication terminals) such as a personal handy phone system (PHS), information terminals having excellent portability (portable information terminals) such as a personal digital assistant (PDA), and the like.

Modified Examples of First, Second, and Fourth Embodiments

Moreover, the first, second, and fourth embodiments have been described on the examples where the predetermined margin only included the margin B, margin D, and margin E. However, in these embodiments as well, the predetermined margin may include only the margin B and margin D while deleting the margin E concerning the operating temperature condition on the assumption that the cellular telephone 1 or 50 be used only in a so-called room temperature range. In other words, it is possible to apply the minimum current value and the maximum current value including only the margin B and margin D (i.e. X+(B+D) and X−(B+D)).

The present invention, as described by way of the aforementioned embodiments, is achieved by supplying a computer program capable of realizing the functions described in the flowchart (FIG. 4) used for the explanation, and then by reading and executing the computer program with the CPU of the relevant apparatus. Moreover, the computer program to be supplied to the apparatus may be stored in a computer-readable memory or a storage device such as a hard disk device.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An electronic apparatus comprising:
   a threshold setting circuit which sets, in a first operation mode for setting a first threshold for determining an overcurrent in the apparatus and a second threshold for determining an undercurrent in the apparatus, a value greater by a predetermined margin than a current detected in the apparatus in the first operation mode, as the first threshold and a value smaller by the predetermined margin than the detected current as the second threshold;

a determination circuit which determines, in a second operation mode different from the first operation mode, an abnormal current state attributable to an overcurrent when a current detected in the apparatus in the second operation mode is greater than the first threshold and an abnormal current state attributable to an undercurrent when the detected current is smaller than the second threshold;

a table including a preset correction coefficient corresponding to a supposed operating temperature of the electronic apparatus; and a temperature sensor which measures an actual operating temperature of the electronic apparatus, wherein said threshold setting circuit includes a threshold correcting table which obtains the correction coefficient corresponding to the actual operating temperature by referring to the table based on the actual operating temperature, and correcting the threshold set up based on the detected current value in the first operation mode by use of the obtained correction coefficient, and said determination circuit determines the abnormal current state using the threshold corrected by said threshold correcting table.

2. The apparatus according to claim 1, wherein the predetermined margin includes minimum allowance required as a standard, and a variation in voltage of a power source of the electronic apparatus.

* * * * *